July 6, 1926.  
M. CHOPIN  
PROCESS OF AND APPARATUS FOR DETERMINING THE ELASTIC  
PROPERTIES OF PLASTIC MATERIALS  
Filed Jan. 26, 1925
1,591,360
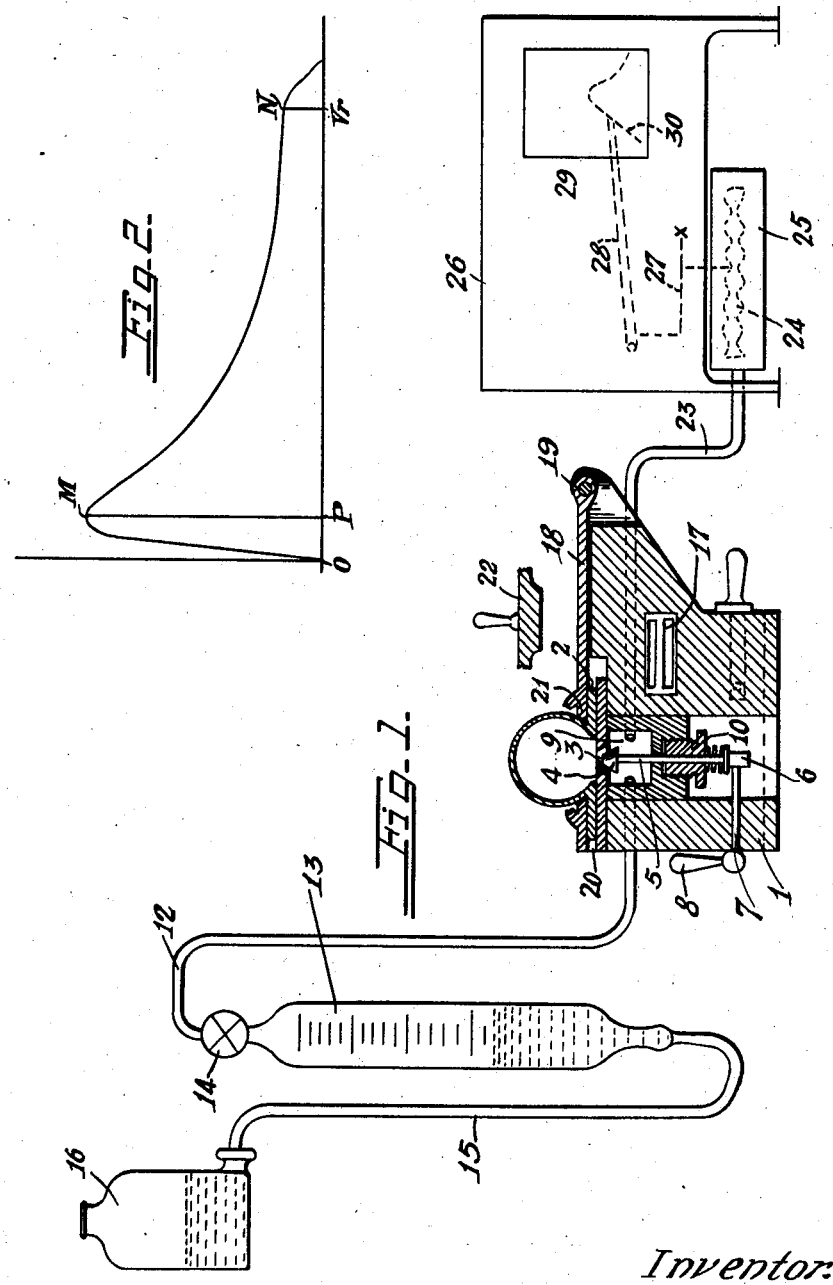
Inventor:  
Marcel Chopin  
by Emil Bimelyke  
Attorney Patented July 6, 1926.

1,591,360

UNITED STATES PATENT OFFICE.

MARCEL CHOPIN, OF BOULOGNE-SUR-SEINE, FRANCE, ASSIGNOR TO SOCIETE D'EX-PLOITATIONS DE BREVETS ET D'APPLICATIONS INDUSTRIELLES, OF NANCY, FRANCE.

PROCESS OF AND APPARATUS FOR DETERMINING THE ELASTIC PROPERTIES OF PLASTIC MATERIALS.

Application filed January 26, 1925, Serial No. 4,840, and in France February 4, 1924.

The present invention involves a process of, and an apparatus for, measuring the elastic properties of plastic materials or substances; and it is specially applicable to flour dough, in which case the apparatus enables the baking value of a particular flour to be ascertained respecting both the swelling or rising that the dough of such flour may undergo during panification and the amount of bread it may yield.

The invention is essentially an improvement on, or development of, that disclosed in my Patent No. 1,468,900 granted September 25, 1923, to which reference may be had for an explanation of the fundamental theory. As therein described, the apparatus comprised in the invention provides for the expansion of a test piece or sample of dough of predetermined shape and thickness into globular form, during the course of which the tenacity of the dough is measured, as well as the maximum extent to which it can be distended up to the breaking point.

In the accompanying drawing, Figure 1 is a view, mainly in vertical section, of the improved form of apparatus, and Fig. 2 represents a diagram of the expansion or deformation of the test piece of dough obtained by means of the apparatus.

As will be apparent, the present apparatus is broadly similar to that disclosed in my above-identified patent; and it comprises a metal base 1 surmounted by a circular metal plate 2. The center of this plate is formed with a frusto-conical opening 3 which is adapted to be closed by a similarly-shaped plug valve 4 carried by a spring-loaded vertical rod or stem 5; the latter being movable endwise by means of an eccentric 6 which is fixed to the inner end of a horizontal shaft 7 journaled in the base 1 and provided with an external handle 8 for turning it. The valve stem 5 passes through a chamber 9 which is disposed directly beneath the opening in plate 2 and which is rendered tight by means of a stuffing-box 10; and this chamber is connected by a flexible tube 12 with the upper end of a graduated tube or gauge 13 provided at said end with a valve 14 and connected at its lower end by a second flexible tube 15 with a water receptacle or flask 16. The base 1 may be fitted with an electric resistance 17 mounted in it and controlled in any suitable manner, so as to enable the tests to be carried out at a constant temperature, as is desirable. All these parts are, or may be, similar to the corresponding parts in the patented construction.

In place of the screw-operated, vertically-movable plate which, in the patented construction, coacts with the fixed plate 2, there is utilized in the present arrangement a swinging plate 18 which is hinged or pivoted at one end on a horizontal rod or shaft 19 suitably mounted in base 1. This plate 18 serves, as before, to compress the test piece which rests on plate 2, the thickness of such piece being determined by a gauge or stop 20 that serves to limit the movement of plate 18. The latter is provided with an opening 21 directly above the test piece; and this opening is normally closed by a plug 22 which is removable to permit the distention of the portion of the test piece thereby exposed in the same general manner as in the earlier apparatus. The lower portion of the plug is made frusto-conical, while the upper portion is cylindrical and is threaded, and the wall of the opening 21 is similarly shaped and threaded; such construction enabling the plug to be rotated to prevent it from sticking to the test piece. As will be understood, however, the plug 22 occupies the opening 21 in plate 18 when the latter is being used to flatten the lump of dough initially placed on plate 2, during which time the valve 4 likewise occupies the opening 3.

In addition to tube 12, a second tube 23 opens at one end into chamber 9, and communicates at its other end with an expansible and contractible diaphragm 24 arranged within a chamber or case 25 that is attached to the main case or chamber 26 of the registering mechanism. This mechanism, as to its precise details, forms no part of the invention and may, therefore, be of any suitable or desired form, and the same is equally true of the operating device 24. In the arrangement illustrated, the upper wall of the diaphragm or vessel 24 is connected by a lever system 27 with a stylus lever or indicator 28 adapted to travel over the surface of a drum 29 so as to transcribe a curve 30 on a suitable record sheet applied to the drum, the latter being rotated at a constant speed in any desired manner.

It will be apparent that some of the air or other pressure fluid forced into chamber 9 will be discharged therefrom through tube 23 into diaphragm 24. The latter will expand and contract proportionately to the pressure variations of the fluid and in so doing will operate the indicator 28 to plot a curve 30 on the record sheet on drum 29. One of such curves is represented in Fig. 2.

Tests are conducted in the following manner: A sample of the particular flour under investigation is kneaded with a certain definite precentage of water until a homogeneous dough is obtained and then this dough is cut into pieces of uniform shape. Plugs 4 and 22 being fixed in their respective seats 5 and 21 and plate 18 being raised, one of the said pieces is placed in the center of plate 2 and then plate 18 is lowered until it meets stop 20. Plug 22 is then removed and plug or valve 4 lowered. The compressed piece of dough may then be considered as divided into two zones, one of which, the central one, has the form of a disk of predetermined, definite dimensions which constitutes the test piece proper and is adapted to be expanded upward through opening 21, while the other one, i. e., the peripheral one held between the two plates, will serve as a fastening for the test piece.

The operating flask 16 is then employed to force into chamber 9 beneath the test piece air or other gaseous pressure fluid to gradually distend said dough which assumes a globular or spherical shape, the walls of the sphere becoming thinner as its radius increases. The water flow is stopped when the sphere breaks. Gauging the water forced into the measuring tube 13 permits the total amount of pressure fluid injected into chamber 9 to be known, and from this can be determined the area of the surface of the sphere at the moment of breaking.

It has been proven that the tenaciousness of the dough, measured by the maximum air pressure, is functional of the amount of water absorbable by the flour in the course of panification, and that a simple ratio exists between the volume of air that will break the film and the specific volume of bread obtainable with such flour.

Air pressure rises from O to M; then gradually decreases as the test piece is distended into a thin film and finally drops to zero when the film bursts. Two magnitudes are desired in the diagram: maximum ordinate M P measures the tenaciousness of the dough; abscissa O Vr measures the volume of air that causes the rupture of the test piece. On the other hand, the work required for the total distention of the test piece is equal to the work effected by the air pressure, such work being expressed by the equation.

$$T = \int_0^{Vr} p \, dv.$$

The function $p = f(v)$ being graphically obtained, the value of T is determined by multiplying the surface included between the curve, the axis of the abscissæ and the final ordinate N.Vr by the value in ergs of one square centimeter of the surface of the diagram given by the experimenting conditions. Finally, the work ratio is calculated between work T and the weight Q of the test piece under trial, which must be cut off and laid away after each test.

The magnitude so obtained will vary within wide limits according to the nature of the wheat with which the tested flours have been made, and measuring the said magnitude will permit determination of the bread making value of such wheat.

I claim as my invention:—

1. Apparatus for determining the elastic properties of plastic materials, comprising coacting fixed and movable plates, the movable plate being pivotally mounted at one end to swing toward the fixed plate and thereby compress between the two plates a specimen of the material to be tested, to form a test piece of predetermined thickness, one plate having a part thereof removable to expose a corresponding portion of the test piece; and means for applying fluid pressure directly back of the exposed portion of the test piece to distend said portion through the opening formed consequent upon the removal of said removable part.

2. In an apparatus for determining the elastic properties of plastic materials, coacting fixed and movable plates for clamping between them a test piece of the material to be tested; one plate being formed with a relatively-large circular opening to expose a corresponding portion of the test piece, the inner portion of the wall of such opening being frusto-conical and the outer portion cylindrical and threaded; and a removable plug for closing said opening having a frusto-conical inner portion to seat in the inner portion of the opening, and a threaded cylindrical outer portion to fit in the outer portion of said opening and engage the threads thereon.

3. In an apparatus for determining the elastic properties of plastic materials, a fixed plate, a hinged plate mounted to swing toward the fixed plate so as to clamp between the two plates a test piece of the material to be tested; one plate being formed with a relatively-large circular opening to expose a corresponding portion of the test piece, the inner portion of the wall of such opening being frusto-conical and the outer portion cylindrical and threaded; and a removable plug for closing said opening having a frusto-conical inner portion to seat in the inner portion of the opening, and a threaded cylindrical outer portion to fit in the outer portion of said opening and engage the threads thereon.

4. In an apparatus for determining the elastic properties of plastic materials, clamping means for holding a test piece of the material being tested, said means including a member which is removable therefrom to expose a definite portion of the test piece; means for applying fluid pressure directly back of such exposed portion to distend the same to the point of rupture; and means for automatically charting the curve of the pressure variations of the fluid during such distention.

5. In an apparatus for determining the elastic properties of plastic materials, clamping means for holding a test piece of the material being tested, said means including a member which is removable therefrom to expose a definite portion of the test piece; means for applying fluid pressure directly back of such exposed portion to distend the same to the point of rupture; and means in operative connection with the pressure fluid circuit for automatically charting the curve of the pressure variations of the fluid during such distention.

6. In an apparatus for determining the elastic properties of plastic materials, clamping means for holding a test piece of the material being tested, said means including a member which is removable therefrom to expose a definite portion of the test piece; means for applying fluid pressure directly back of such exposed portion to distend the same to the point of rupture; and means in operative connection with the pressure fluid circuit for constantly indicating the variations in the pressure of said fluid during such distention.

7. A method of determining the elastic properties of plastic materials, comprising the steps of forming a test piece of constant predetermined thickness of the material to be tested; subjecting the test piece to the pressure of a gaseous fluid to distend it to the point of rupture; and charting the curve of the variations of pressure of said fluid during such distention.

8. A method of determining the elastic properties of plastic materials, comprising the steps of compressing a specimen of the material to be tested to form a layer of constant predetermined thickness; relieving the pressure upon a definite portion of the layer while maintaining the pressure upon the remainder thereof; applying pressure against said portion to distend it to the rupture point; and constantly indicating the pressure variations during such distention.

9. A method of determining the elastic properties of plastic materials, comprising the steps of compressing a specimen of the material to be tested to form a layer of constant predetermined thickness; relieving the pressure upon a definite portion of the layer while maintaining the pressure upon the remainder thereof; applying pressure against said portion to distend it to the rupture point; and constantly recording the pressure throughout such distention.

In testimony whereof I affix my signature.

MARCEL CHOPIN.